G. STEENSTRA.
FENDER FOR AUTOMOBILES AND TRUCKS.
APPLICATION FILED MAY 14, 1920.
1,377,736. Patented May 10, 1921.
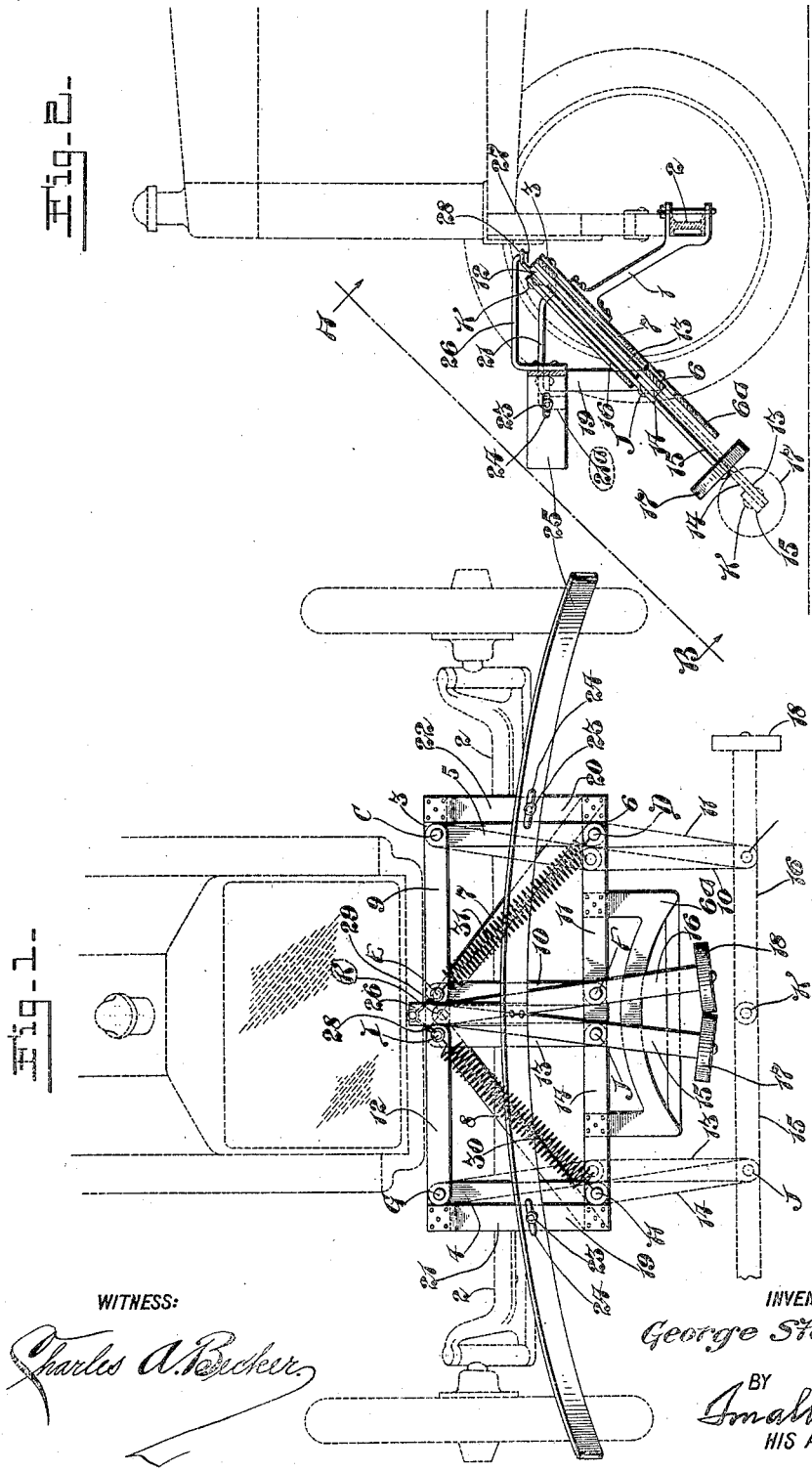
WITNESS:
Charles A. Becker
INVENTOR.
George Steenstra,
BY
Small & Small
HIS ATTORNEYS.

UNITED STATES PATENT OFFICE.

GEORGE STEENSTRA, OF ST. LOUIS, MISSOURI, ASSIGNOR OF ONE-HALF TO LOUIS VAN BERG, OF ST. LOUIS, MISSOURI.

FENDER FOR AUTOMOBILES AND TRUCKS.

1,377,736.   Specification of Letters Patent.   Patented May 10, 1921.

Application filed May 14, 1920.   Serial No. 381,303.

*To all whom it may concern:*

Be it known that I, GEORGE STEENSTRA, a citizen of the United States of America, residing at St. Louis, in the State of Missouri, have invented a new and useful Fender for Automobiles and Trucks, of which the following is a specification.

This invention has for its prime object the provision of a simple, inexpensive, durable and efficient fender for attachment to passenger automobiles and commercial trucks, comprising means whereby the device will be automatically extended from a folded position upon coming in contact with a pedestrian and thus prevent the latter from passing under the vehicle.

Other objects and advantages will become apparent upon consideration of the following portions of the specification and the appended claims.

Referring to the annexed drawing, Figure 1 is a top plan view of the fender attached to an automobile with its position when extended shown in dotted outline and Fig. 2 a side sectional view taken slightly to one side of the center of Fig. 1.

Preferably the fender is made throughout of strap iron and is supported by a standard 1 affixed to the front axle of the vehicle. The non-extensible part of the device consists of sections 3, 4, 5 and 6 riveted together to form an oblong frame and further secured by braces 7—8, section 6 carrying an extension which substantially fills the space intervening between said section and the outer edge of the fender when the latter is opened as shown in Fig. 1.

The extensible elements consist of toggle links 9, 10 and 11, on one side of the center line, and 12, 13 and 14 on the other side of said line, links 9 and 11 being pivotally connected with rigid frame section 5 at points C and D and with link 10 at points E and F, while links 12 and 14 are likewise connected with frame section 4 at points G and H and with link 13 at points I and J.

Arms 15—16 pivotally connected at K and secured to links 10, 11, 13 and 14 by pivots F and J are provided with small wheels 17—18 which are intended to prevent contact of said arms with the ground when they are depressed, after extension, by the weight of the person carried by the fender.

Struts 19—20 secured to frame section 6 serve to support rods 21—22 extending from frame section 3, the outer extremity of said rods being bent downwardly as at $21^a$ (Fig. 2) and provided with studs 23 which project through narrow slots 24 in bar 25. Secured at the center of said bar and extending rearwardly over frame section 3 is a trigger 26 terminating in a cap 27 (Fig. 2) which affords means for the normal retention of hooks 28—29 secured to the pivots E and I, and it will be appreciated that, when bar 25 is moved inwardly upon contact with a pedestrian, said hooks will be released by rearward movement of the trigger and thus permit the instant automatic extension of links 9 to 14, inclusive, and arms 15—16 through the agency of helical springs 30—31 as shown in dotted outline.

It will be understood that I do not intend to limit myself to the precise construction or arrangement of parts illustrated and the right is reserved of altering the same, within the scope of the appended claims, so as to adapt the fender to vehicles of various makes and in such particulars as may be dictated by future experience.

Having fully described the invention and its manner of operation, what I claim as new and desire to secure by Letters-Patent is:—

1. A fender comprising a frame disposed between the front wheels of a vehicle, members foldable upon said frame adapted to enlarge the supporting surface of the fender, and means for automatically extending said members relative to said frame.

2. A fender comprising a frame disposed between the front wheels of a vehicle, members foldable upon said frame adapted to enlarge the supporting surface of the fender, and means, actuated by contact with an object in the path of the vehicle, for automatically extending said members relative to said frame.

3. A fender comprising a frame disposed between the front wheels of a vehicle, hingedly connected links pivotally secured to and foldable upon said frame, a bar positioned above and extending across said frame, springs adapted to project said links outward from said frame to enlarge the supporting surface of the fender, means for retaining said links upon said frame against the resistance of said springs, and devices for automatically releasing said means upon contact of said bar with an object in the path of the vehicle.

GEORGE STEENSTRA.

Witnesses:
 LOUIS VAN BERG,
 SARAH M. HAWLEY.